(12) United States Patent
Manousakis et al.

(10) Patent No.: US 8,014,819 B2
(45) Date of Patent: Sep. 6, 2011

(54) INTELLIGENT CONNECTIVITY FRAMEWORK FOR THE SIMULTANEOUS USE OF MULTIPLE INTERFACES

(75) Inventors: Kyriakos Manousakis, New Brunswick, NJ (US); Praveen Gopalakrishnan, Hillsboro, OR (US); David Famolari, Stewartsville, NJ (US); Eric Van Den Berg, Hoboken, NJ (US)

(73) Assignees: Toshiba America Research, Inc, Piscataway, NJ (US); Telcordia Technologies, Inc., Piscataway, NJ (US)

( * ) Notice: Subject to any disclaimer, the term of this patent is extended or adjusted under 35 U.S.C. 154(b) by 792 days.

(21) Appl. No.: 12/114,940

(22) Filed: May 5, 2008

(65) Prior Publication Data

US 2008/0311855 A1    Dec. 18, 2008

Related U.S. Application Data

(60) Provisional application No. 60/916,087, filed on May 4, 2007.

(51) Int. Cl.
*H04M 1/00* (2006.01)
*H04B 1/38* (2006.01)
*H04L 12/66* (2006.01)

(52) U.S. Cl. ............... 455/552.1; 455/557; 370/463

(58) Field of Classification Search ............... 455/550.1, 455/552.1, 557; 370/310, 463, 254
See application file for complete search history.

(56) References Cited

U.S. PATENT DOCUMENTS

| 2003/0133417 | A1 | 7/2003 | Badt, Jr. |
| 2004/0014491 | A1 | 1/2004 | Weigand |
| 2004/0228304 | A1 | 11/2004 | Riedel et al. |
| 2005/0099943 | A1 | 5/2005 | Naghian et al. |
| 2006/0233191 | A1* | 10/2006 | Pirzada et al. ............... 370/463 |

OTHER PUBLICATIONS

A.C. Snoeren, Adaptive Inverse Multiplexing for Wide-area Wireless Networks, 1999, p. 1665-1672, vol. 3, MIT, USA.
D.S Phatak, A Novel Mechanism for Data Streaming Across Multiple IP Links for Improving Throughput and Reliability in Mobile Environments, 2002, pp. 773-781, vol. 2, Maryland University, USA.
A. Abd El Al, A Transport Layer Load Sharing Mechanism for Mobile Wireless Hosts, 2004, p. 87, IEEE Computer Society, USA.
H. Hsieh, PTCP An End-to-End Transport Layer Protocol for Striped Connection, Nov. 23, 2002, p. 24-33, Georgia Institute of Technology, USA.
R.G Ogier, Distributed Algorithms for Computing Shortest Paris of Disjoint Paths, Mar. 1992, p. 443-455, vol. 39, Issue 2, SRI Int. USA.
I. Cidon, Analysis of Multi-path Routing, Dec. 1999, pp. 885-896, vol. 7, Issue 6, Haifa.
P. Sharma, Handheld Routers: Intelligent Bandwidth Aggregation for Mobile Collaborative Communities, Oct. 25, 2004 p. 537-547, Hewiett-Packard Lab USA.
S. Mao, Video Transport over Ad Hoc Networks-Multistream Coding with Multipath Transport, Jun. 24, 2003, p. 1-53, USA.
S. De, Integrated Cellular and Ad Hoc Relay Systems: Pushing the Performance Limits of Conventional Wireless Networks, 2002, p. 1-8, USA.

(Continued)

*Primary Examiner* — Nguyen Vo
(74) *Attorney, Agent, or Firm* — Westerman, Hattori, Daniels & Adrian, LLP (57) ABSTRACT

A system and method comprising a framework configured to enable wireless devices to intelligently and simultaneously use multiple wireless interfaces of the wireless devices.

21 Claims, 4 Drawing Sheets

OTHER PUBLICATIONS

H. Luo, UCAN: A Unified Cellular and Ad-Hoc Network Architecture, 2003, p. 353-367, USA.

A. Snoeren, "Adaptive inverse multiplexing for wide area wireless networks", Proceedings of the IEEE Globecomm, Dec. 1999, p. 1-8, Brazil.

J. Li, "Performance Characterization of Traffic Equalizers on Heterogeneous Communication Links", 2006, p. 1-8, USA.

D. Pathak, "A novel mechanism for data streaming across multiple IP links for improving throughput and reliability in mobile environments", IEEE INFOCOM, 2002, p. 1-9, USA.

R. Stewart, "Stream Control Transmission Protocol", Oct. 2000, p. 1-126, The Internet Society, USA.

I. Cidon, "Analysis of multi-path routing", IEEE/ACM Transactions on Networking, Dec. 1999, p. 1-13, USA.

P. Sharma, "Handheld-routers: Intelligent bandwidth aggregation for mobile collaborative communities", HP Labs Technical Report, May 2003, p. 1-16, USA.

S. Mao, "Video transport over ad-hoc networks: Multi-stream coding with multi-path transport", IEEE JSAC, Dec. 2003, p. 1-53, vol. 21, USA.

S. De, "Integrated Cellular and Ad Hoc Relay (iCAR) Systems: Pushing the Performance Limits of Conventional Wireless Networks," HICSS, 2002, p. 1-8, USA.

H. Luo, "UCAN: A Unified Cellular and Ad-Hoc Network Architecture," ACM MobiCom'03, 2003, p. 1-15, USA.

International Search Report, Jun. 1, 2009, p. 1-8.

* cited by examiner

Figure 1. INTELiCON architecture

Figure 2. INTELiCON lab prototype

Figure 3: Dynamic Selection of strategies

FIG. 4

INTELLIGENT CONNECTIVITY FRAMEWORK FOR THE SIMULTANEOUS USE OF MULTIPLE INTERFACES

BACKGROUND

1. Field of the Invention

The present application relates generally to wireless devices and, more particularly, to wireless devices employing multiple interfaces, and preferred embodiments provide a novel intelligent connectivity framework for the simultaneous use of multiple interfaces.

2. Background Discussion

To take full advantage of different radio technologies, a mobile device can be configured to select which radio interfaces (i.e., radio networks) to use and when to switch between the interfaces (hence, between radio networks), preferably in a seamless manner with little interruption to user applications.

Figure 4:
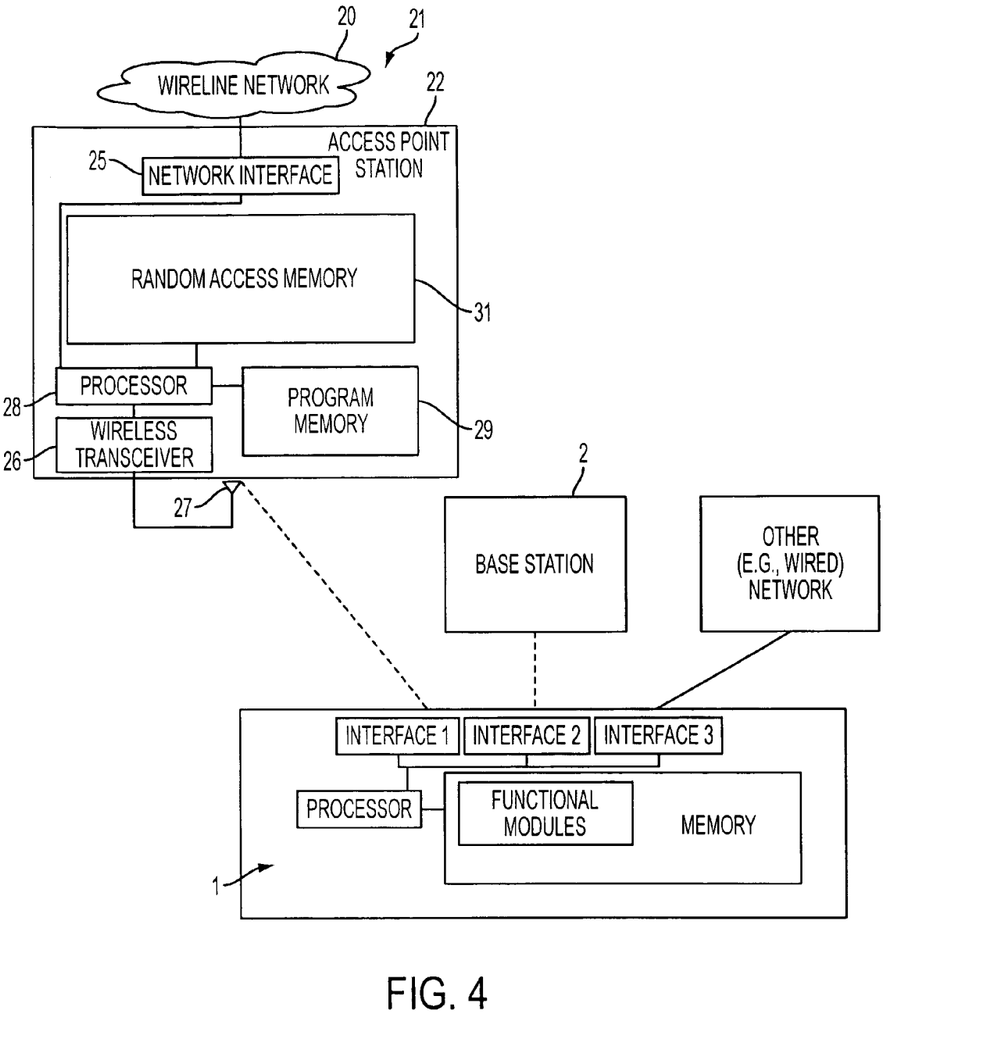
FIG. 4 is an architectural diagram depicting an illustrative environment in which a mobile device having a plurality of interfaces communicates with a plurality of networks.

With reference to FIG. 4, in some illustrative examples, a mobile device 1 can include a plurality of interfaces. In the illustrated embodiment, three interfaces are shown: Interface 1; Interface 2 and Interface 3. However, in various examples any number of interfaces can be employed. In illustrative cases, a mobile device can include, e.g., portable computers, personal desk-top computers, PDAs, portable voice-over-IP telephones and/or other devices. Typically, such mobile devices will include a transceiver (including an antenna for communication with the access point), a processor, memory (including, e.g., program memory and Random Access Memory). As also shown, the memory can include a program or module for carrying out functionality. In various embodiments, processes to be carried out by the mobile device can be performed via software, hardware and/or firmware as may be appropriate based on circumstances.

Figure 1:
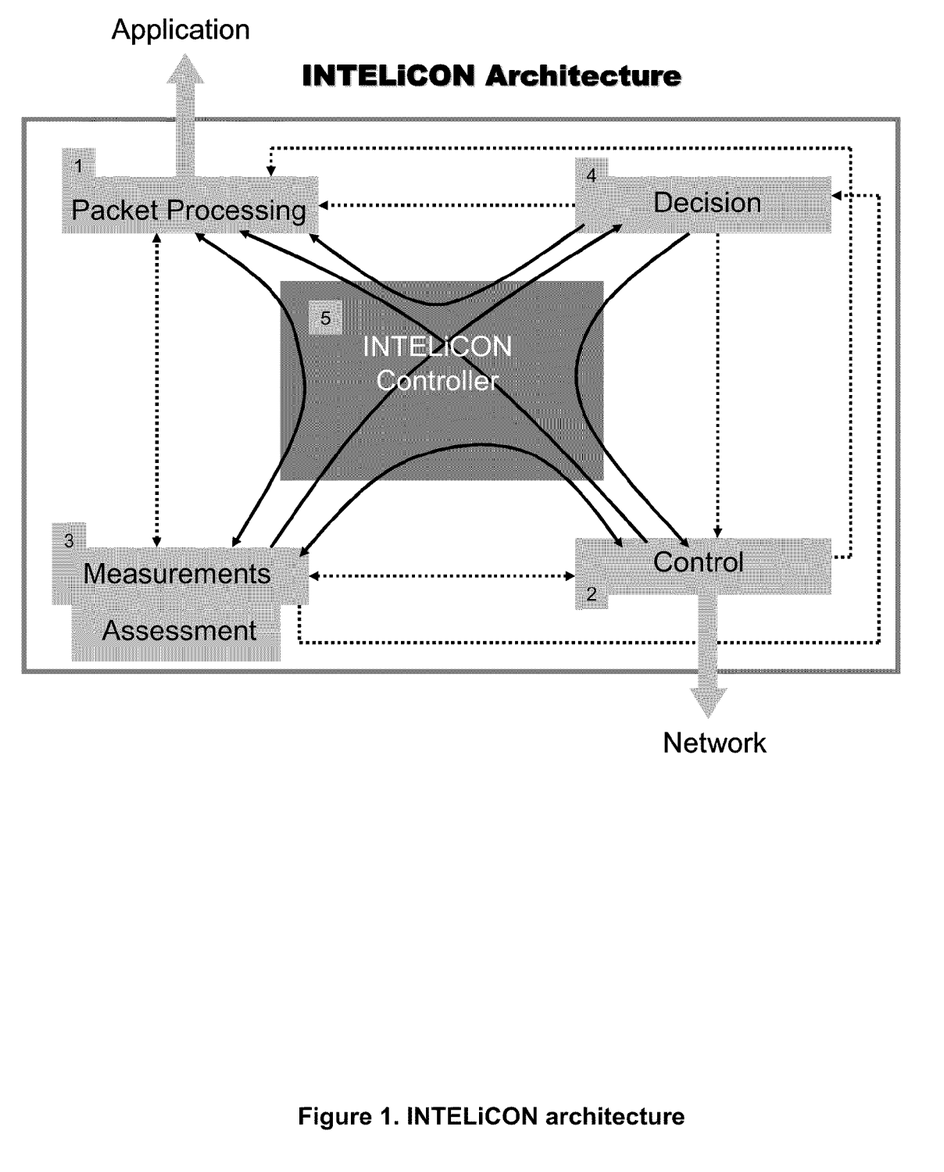
FIG. 1 is an architectural diagram depicting components according to some illustrative and non-limiting embodiments.

In an illustrative example shown in FIG. 4, a mobile device 1 is shown that is capable of communicating via a plurality of networks, such as, e.g., via Interface 1-3. For example, the mobile device can communicate via the Access Point 22 or via a Base Station 2, similar to that shown in FIG. 1(B). Additionally, FIG. 4 also schematically depicts an example in which the mobile device 1 can also communicate with another network, such as, e.g., another wireless network or a wired networks. With reference to FIG. 4, in some illustrative and non-limiting examples, the access point 22 can be within a wireless local area network (WLAN) connected to a wireline network 20. In some examples, the wireline network 20 can include the Internet or a corporate data processing network. In some examples, the access point 22 can be a wireless router. In some embodiments, the access point 22 can have a network interface 25 linked to the wireline network 21 and a wireless transceiver in communication with the mobile device 1 and with other mobile devices. By way of example, the wireless transceiver 26 can include an antenna 27 for radio or microwave frequency communication with the mobile devices. The access point 22 preferably also has a processor 28, a program memory 29, and a random access memory 31.

Consider an environment where heterogeneous network technologies co-exist and mobile devices have multiple network interfaces. In such a case, a mobile user can, thus, potentially have access to multiple heterogeneous wireless networks at the same time.

In such a scenario, a mobile application has a rich choice of network(s) to use and ways to use them resulting in improved quality and reliability for the applications. However, today's technology limits our ability to exploit the presence of multiple wireless interfaces. Factors that contribute to this limitation include protocols that do not enable applications to communicate over multiple network interfaces simultaneously, the unavailability of real-time performance information needed to make intelligent, dynamic connectivity decisions, and the lack of a transmission framework specific to multiple interface devices. Furthermore, as the wireless networking environment and the end user's requirements change, a system is needed that can dynamically select and implement different connectivity strategies best suited for the current environment and service quality requirements.

Problems of utilizing multiple interfaces have been studied in the past. Researchers have identified the benefits of utilizing multiple interfaces for achieving better end-to-end performance. There are various approaches introduced to different layers of OSI model for attempting to exploit these benefits. In the following paragraphs, a sampling of such work is provided, categorized by the OSI layer at which each approach is applied.

Reference [1] below relates to an adaptive inverse multiplexing for CDPD wireless networks. Packets are split into fragments of size proportional to the observed throughput of the links. Fragments are tunneled over multiple links using Multi-link PPP. Multi-link PPP is designed to aggregate multiple logical data channels into one logical link.

Reference [2] below relates to a Linux based traffic scheduler wTEQL and propose a weighted round-robin mechanism to split traffic across multiple heterogeneous links.

Reference [3] below relates to a mechanism to aggregate bandwidth of multiple IP links, by splitting a data follow across multiple IP interfaces at the IP level. The mechanism is to use tunneling by encapsulating the original packet at the IP layer with another IP header and at the receiving end, stripping out the extra header.

Reference [4] below relates to load sharing LS-SCTP, proposing a transport layer solution. The proposed solution involves an extension to the SCTP protocol (see reference [5] below), and adds the feature of using multiple interfaces simultaneously to carry one connection. The SCTP architecture has a path selection module and a path monitor module.

Reference [6] below relates to another transport layer solution, the p-TCP. The pTCP is a wrapper that interacts with a modified TCP called TCP-virtual (TCP-v). A TCP-v connection is established for each interface, and pTCP manages send buffers across the TCP-v pipes. The striping is performed by pTCP and is based on congestion window size of each TCP-v connection. When congestion occurs on a certain pipe, pTCP performs data reallocation to another pipe with large congestion window.

There also exists a body of knowledge on strategies effective bandwidth aggregation when there are multiple end-to-end routes. Multi-path and QoS routing are considered in references [7] and [8] below. Layered priority striping of video across multiple routes is discussed in reference [9] below. In reference [10] below, the authors consider multi-path transport over multiple routes in an ad-hoc network to improve video quality.

Moreover, there is another class of work, which studies the utilization of multiple interfaces, but where only one interface can be active and transmitting. The rest of the interfaces are being used for failover. In this regard, references [11], [12] and [13] below are works that belong in this class of approaches. In reference [11] below, De, et al. proposed the iCAR system, which uses cellular and ad hoc interfaces to relieve congestion. In the iCAR system, nodes primarily use the cellular interface to communicate with the base station. When the cell becomes congested, the nodes can communicate with base stations in other cells by relaying packets using the ad hoc interface. In reference [12] below, Luo et al. proposed UCAN, which uses 3G and 802.11 radios. In UCAN, when the channel quality between the base station and the mobile node is poor, the base station forwards packets to a proxy client, and the client relays packets to the mobile node using the 802.11 interface. Lastly, in reference [13] below, Yoon, et al. provide an approach that prefers the high-rate, short-range radio as the primary means of communication, and uses the low-rate, long-range radio as a backup channel.

The disclosures of each of the following thirteen references [1] to [13] are incorporated herein in their entireties as if recited herein in full:

Reference [1]: A. C. Snoeren, "Adaptive inverse multiplexing for wide area wireless networks", Proceedings of the IEEE Globecomm, Rio de Janeiro, Brazil, December 1999;

Reference [2]: J. Li, J. Brassil, "Performance Characterization of Traffic Equalizers on Heterogeneous Communication Links", Submitted to Netwoking 2006;

Reference [3]: D. Pathak, T. Goff, "A novel mechanism for data streaming across multiple IP links for improving throughput and reliability in mobile environments", IEEE INFOCOM, New York, USA, 2002;

Reference [4]: A. El Al, T. Sasadawi, M. Lee, "A Transport layer load sharing mechanism for mobile wireless hosts", IEEE Conference on Pervasive Computing and Communications Workshops, 2004;

Reference [5]: R. Stewart, Q. Xie et. al, "Stream Control Transmission Protocol", IETF RFC 2960, 2000;

Reference [6]: H. Hsieh, R. Sivakumar, "pTCP: Am end-to-end transport layer protocol for striped connections", Proceedings of IEEE International Conference on Network Protocols, Paris, France, November 2002;

Reference [7]: R. Ogier, V. Ruenburg, N. Shacham, "Distributed algorithms for computing shortest pairs of disjoint paths", IEEE Transactions on Information Theory, March 1993;

Reference [8]: I. Cidon, R. Rom, Y. Shavim, "Analysis of multi-path routing", I.E.E.E./ACM Transactions on Networking, December 1999;

Reference [9]: P. Sharma, S. Lee, J. Brassil, K Shin, "Handheld-routers: Intelligent bandwidth aggregation for mobile collaborative communities, HP Labs Technical Report, May 2003;

Reference [10]: S. Mao, S. Lin, S. Panwar, Y. Wang, E. Celibi, "Video transport over ad-hoc networks: Multi-stream coding with multi-path transport", IEEE JSAC, Vol 21, December 2003;

Reference [11]: S. De, O. Tonguz, H. Wu and C. Qiao, "Integrated Cellular and Ad Hoc Relay (iCAR) Systems: Pushing the Performance Limits of Conventional Wireless Networks," HICSS, pp. 3931-3938, 2002;

Reference [12]: H. Luo, Ramachandran Ramjee, Prasun Sinha, Li Li, and Songwu Lu, "UCAN: A Unified Cellular and Ad-Hoc Network Architecture," ACM MobiCom'03, 2003;

Reference [13]: Wonyong Yoon, Jungmin; So, and Nitin H. Vaidya, "Routing Exploiting Multiple Heterogeneous Wireless Interfaces: A TCP Performance Study," IEEE MILCOM 2006, Washington DC, October 2006;

Reference [14]: S. Kirkpatrick, C. D. Gelatt, M. P. Vecchi, "Optimization by Simulated Annealing," Science Magazine, Vol. 220, number 4598, May 1983;

Reference [15]: S. Mao, S. Lin, S. Panwar, Y. Wang, E. Celibi, "Video Transport over Ad-Hoc Networks: Multi-Stream Coding with Multi-Path Transport," I.E.E.E. JSAC, Vol 21, December, 2003;

Reference [16]: VLC Media Player, http://www.videolan.org/vlc;

Reference [17]: Netfilter/IPtables http://www.netfilter.org/; and

Reference [18]: NISTnet, http://www-x.antd.nist.gov/nistnet/.

However, the above-noted indicative studies on the topic of simultaneous utilization of multiple interfaces have a number of significant weaknesses and deficiencies, including, e.g., some weaknesses and deficiencies as described below.

Adaptive Inverse Multiplexing (Reference [1]): The effective functionality of this approach is based on stripping a flow across multiple channels/links that present similar characteristics, since the stripping is based on round robin. However, the effectiveness of the approach degrades rapidly when the participating channels/links have different characteristics (e.g., round robin cannot handle the diversity of the links). Furthermore, and practically, the adaptive inverse multiplexing approach is essentially infeasible because interfaces on a given device will typically have different IP addresses assigned and will be controlled by completely independent Internet Service Providers (ISPs). Hence, the solution of bundling multiple ISP links into one logical link may not be feasible.

Stream Control Traport Protocol (SCTP) (References [4] and [5]): This approach is based on the design of a new transport layer SCTP, which will have to substitute the existing TCP/UDP transport layers if we want to take advantage of the multi-homing and multi-streaming capabilities. This is not a very transparent approach, resulting into limited scope utilization, because the applications have to be build around the new transport protocol. With respect to probing and adaptation properties offered by the approach, they are limitations compared to what the preferred embodiments of the present invention can provide and offer. For example, the capability of the path monitor module is limited to finding out if a link is available or not. Similarly, the path selection module makes decisions based on only the observed round-trip times.

On the other hand, the solutions according to the preferred embodiments of the present invention can be more generic and can have the flexibility to collect a variety of information and to make more intelligent decisions.

Parallel TCP (pTCP) (Reference [6]): One major weakness of this pTCP approach is its lack of adaptation when new paths become available or when old paths become unusable. Notably, pTCP does not support dynamic addition/deletion of paths during the lifetime of the transport connection.

iCAR, UCAN and Routing Exploiting Heterogeneous Wireless Interfaces (References [11], [12] and [13]): Although the approaches represented from these references may strip a flow between multiple interfaces for mitigating the problem of failed links, they do not attempt to utilize the available interfaces simultaneously. On the other hand, they mainly select one interface as the main one for transmitting the data and when the health of this interface degrades significantly, they switch to a backup interface for completing the transmission.

On the other hand, the preferred embodiments of the present invention can, e.g., simultaneously utilize a number of or all of the available interfaces in a most appropriate manner for offering the best service available to the end user (i.e., it is not only a matter of completing the transmission avoiding the interruptions caused by failed links).

Generally speaking, the related works attempt to solve specific problems, provide piece-wise solutions or depend on specific implementations/protocols. None of the related works even contemplate having a wireless device make simultaneous use of multiple interface options nor, consequently, the need for an architecture that meets those requirements.

However, for a complete solution that enables substantially any application to use its networking options intelligently, all the pieces of the architecture need to come together. Furthermore, the framework needs to be flexible to incorporate new/existing protocols, and needs to not be bound to using specific protocols/implementations. The preferred embodiments described herein (which may be, in some instances, referred to under the trade name INTELiCON) involve novel and advantageous systems and methods for providing both a complete as well as a flexible framework for intelligent connectivity decisions for multi-interface devices.

SUMMARY

The preferred embodiments overcome the above and/or other problems in the background art.

We introduce a new networking approach that significantly improves the performance, reliability and resiliency of network data delivery for home media and other applications. The Intelligent Connectivity (INTELiCON) framework leverages multiple network links simultaneously in an intelligent, dynamic and coordinated fashion to ensure perfect video and audio delivery, even in the presence of extreme interference and packet errors. The techniques employed by INTELiCON can be used over a host of wireless and wired networking technologies, including Wi-Fi, UWB, Ethernet and others. INTELiCON manages media transmissions over several network interfaces simultaneously and employs intelligent feedback algorithms that dynamically adapt to changing conditions to ensure smooth real-time video and audio playback. In addition, INTELiCON offers significant throughput increases that can more than triple the application bandwidth for non real-time file delivery as compared with traditional solutions.

Widespread deployment of Wi-Fi together with 3G upgrades to cellular networks is rapidly creating areas where multiple wireless IP technologies are accessible. WiMAX will further contribute to this phenomenon. The ability to use diverse access technologies simultaneously creates opportunities to improve application service quality and reliability. In this application, we present an intelligent connectivity framework (INTELiCON) that allows devices to exploit access diversity in new ways. INTELiCON provides a modular, flexible platform for discovering, selecting, executing and evaluating the most appropriate connectivity strategies. The framework executes connectivity strategies and evaluates their effectiveness while maintaining transparency to the application layer. Furthermore INTELiCON can also dynamically implement new strategies to meet variations in network conditions or application requirements. We present the architectural characteristics of the INTELiCON framework with details of a prototype implementation and show how the framework exploits access diversity to support high-quality streaming video despite limited resources and unreliable links.

A primary feature of the 4G vision is that of an environment where heterogeneous network technologies co-exist and mobile devices have multiple network interfaces. A mobile user can thus potentially have simultaneous access to multiple heterogeneous wireless networks. In such a scenario, a mobile application has a rich choice of network(s) to use and ways to use them. We refer to how a device utilizes its available radio interfaces as its 'connectivity strategy'. Today's technology limits our ability to implement all available connectivity strategies. Factors that contribute to this limitation include protocols that do not enable applications to communicate over multiple network interfaces simultaneously; the unavailability of real-time performance information needed to make intelligent, dynamic connectivity decisions; and the lack of a transmission framework specific to multiple interface devices.

Furthermore, as the wireless networking environments and the end user's requirements change, a system is needed that can dynamically select and implement different connectivity strategies best suited for the current environment and service quality requirements. We propose a multiple interfaces device framework (INTELiCON) that both extends the set of realizable connectivity strategies and can intelligently adapt strategies to best meet current conditions.

We can demonstrate the deficiencies in today's systems as well as the possibilities that could exist through a simple scenario. Consider a mobile user with two interfaces: a 3G and a WLAN interface. Further, assume that there are two different applications, a video session and a data-transfer session, both communicating with the same end-host across the internet. Commercial implementations today force both applications to use only one interface, thus the connectivity choice boils down to selecting one, and only one, of the available interfaces. It is easy to visualize situations where the network being used is congested and yet the second interface remains under-utilized.

Next we mention some sample connectivity strategies that are possible but technologies are not in place yet to support them. The video session, being real-time and requiring timely delivery can exclusively use the higher-bandwidth WLAN connection and the data-transfer can use the lower-bandwidth 3G network. Another strategy would be to use the WLAN network for the video session and then alternate data packets over the 3G and WLAN links. Such a scenario would help balance the load across the available networks. Alternating packets is a form of aggregation strategy that can be used to deliver a high-bandwidth session by aggregating multiple low bandwidth links. A third strategy would be to use a simple duplication coding scheme that would duplicate video and data packets and send a copy over each interface. While such a strategy may not be desirable when efficient bandwidth utilization is the objective or when usage charges may apply, However, this redundancy is beneficial in terms of failover reliability—if one interface should suddenly go down (a dropped call in cellular, for example), the sessions continue uninterrupted. No single strategy is desirable in all scenarios or under all objectives. Hence, it is important to have a framework that can dynamically evaluate and adapt connectivity strategies as needed.

All the above scenarios are examples of connectivity strategies that determine what information is transmitted over which network. The selection of an appropriate connectivity strategy for exploiting multiple networks (or interfaces) depends on knowing the requirements of each application, the network conditions and the quality of the service offered. In order to fully exploit the diversity offered by the presence of multiple interfaces, mobile devices need an overall framework with which they can discover, decide, execute and evaluate intelligent connectivity strategies.

Discovery refers to obtaining information about the network environment (i.e. expected delay, jitter, etc.) and application requirements (i.e. maximum tolerable delay and minimum required throughput). It is also important to discover information about the peer device as well, including its current networking environment, whether or not it supports multi-interface communication and, if so, the configuration details of its alternative interfaces.

A notable part of the INTELiCON architecture is using the information made available via discovery to decide on an intelligent connectivity strategy. Multi-objective optimization algorithms or simple heuristics may be used for making these decisions. Executing the chosen strategy requires know how to adapt the necessary protocols/systems to carry application traffic over multiple interfaces. Streaming an application session over multiple interfaces simultaneously is not supported by any of today's standard internet protocols.

Executing the decided upon connectivity strategy raises some challenges that need to be considered in the design of the implementation. Our multi-interface framework should be able to support all applications without requiring application-layer modifications. Therefore, transparency for end applications is an important design goal. The decision process should also account for the side-effects of streaming a session across heterogeneous interfaces including extra processing of out of order packets at the receiver.

Wireless networking environments can be very dynamic, and along with changing user/application requirements demands that the connectivity strategy be adaptive. Our multi-interface framework needs to be able to evaluate the appropriateness of the chosen connectivity strategy to the present conditions. This evaluation process forms the basis for adapting the strategy to better meet current network and application state. The INTELiCON architecture provides a general framework to accomplish the features mentioned above. The framework need not rely on any particular implementation, algorithm or standard. It is flexible enough to incorporate current standards and algorithms, as well future ones, to perform a particular task. For example, the emerging IEEE 802.21 standard for Media Independent Handoff can be used to discover network capabilities and the Session Initiation Protocol (SIP) can be used to discover the capabilities of a peer device.

According to some of the preferred embodiments, a framework is provided that enables devices to intelligently and simultaneously use multiple wireless interfaces they have. In the preferred embodiments, the framework provides a modular and flexible platform for discovering, selecting, executing and evaluating the most appropriate use of interfaces.

According to some embodiments, an intelligent connectivity framework for the simultaneous use of multiple interfaces of a wireless device is provided that includes: a wireless device having a plurality of heterogeneous wireless network interfaces; the wireless device being configured to discover metrics related to the status of networks and the quality of a transmission; the wireless device being configured to decide on an intelligent connectivity strategy involving use of a plurality of the multiple network interfaces based on the discovered metrics; and the wireless device being configured to stream an application session over a plurality of the multiple interfaces simultaneously without application-layer modifications.

In some examples, the intelligent connectivity framework further includes a similar intelligent connectivity framework on a plurality of mobile peer devices. In some examples, the wireless device further includes a measurements module for collecting information related to the metrics. In some examples, the measurements module is configured to collect metrics from remote sources, including remote peer mobile devices. In some examples, the mobile device is configured to receive metrics information from remote sources via a control channel. In some examples, the measurements module is configured to collect metrics from local sources. In some other examples, the measurements module is configured to monitor and/or probe network performance metrics related to link quality and/or available bandwidth. In some other examples, the wireless device further includes a decision module for deciding on a strategy for employing multiple interfaces based on information related to the metrics within the measurements module.

In some other examples, the decision module continually assesses quality and/or network conditions based on the information and dynamically adapts the strategy in real time. In some other examples, the decision module is configured to decide on a strategy for employing multiple interfaces based on network environment information, service quality information, and costs of transmission strategies. In some other examples, the decision module renders a decision based on optimization algorithms.

In some other examples, the wireless device further includes a packet processing module that implements the strategy decided by the decision module. In some examples, the packet processing module is configured to account for differences in link speeds. In some examples, the packet processing module is configured to buffer received packets. In some examples, the packet processing module is configured to exchange performance information by piggy-backing status information with transmitted packets.

In some examples, the wireless device further includes a control module for managing the control channel to exchange information related to the transmission strategy. In some examples, the wireless device is configured to communicate performance information related to the metrics both in-band and out-band. In some examples, in-band information is communicated by piggy-backing on a transmitted payload packet by the wireless device as a transmitting peer, and recovering such information at a receiving peer before delivering the packet to the application. In some examples, out-band information is communicated via a dedicated control channel between the wireless device and another peer. In some examples, during communication between the wireless device and another peer, at the sender side, measurements, synchronization data and performance metrics are passed to the measurement and decision modules, and at the receiver side, control data are delivered to the packet processing and measurement modules.

According to some other embodiments, a method for the intelligent management of and simultaneous use of multiple interfaces of a wireless device is performed that includes: providing a wireless device having a plurality of heterogeneous wireless network interfaces; the wireless device discovering metrics related to the status of networks and the quality of a transmission; the wireless device deciding on an intelligent connectivity strategy involving use of a plurality of the multiple network interfaces based on the discovered metrics; and the wireless device conducting an application session over a plurality of the multiple interfaces simultaneously without application-layer modifications.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

According to some preferred embodiments, a framework is provided that enables devices (e.g., mobile devices) to intelligently and simultaneously use multiple wireless interfaces they have.

According to some prefer embodiments, a modular and flexible platform for discovering, selecting, executing and evaluating the most appropriate use of interfaces is provided.

According to some preferred embodiments, a significant part of an INTELiCON architecture involves using the information made available via discovery to decide on an intelligent connectivity strategy. Multi-objective optimization algorithms or simple heuristics may be used for making these decisions. Executing the chosen strategy requires know how to adapt the necessary protocols/systems to carry application traffic over multiple interfaces. Streaming an application session over multiple interfaces simultaneously is not supported by any of today's standard internet protocols. Executing the decided upon connectivity strategy raises some challenges that need to be considered in the design of the implementation. Our multi-interface framework should be able to support all applications without requiring application-layer modifications. Therefore, transparency for end applications is an important design goal. The decision process should also account for the side-effects of streaming a session across heterogeneous interfaces including out of order packets at the receiver.

Wireless networking environments can be very dynamic, and along with changing user/application requirements demands that the connectivity strategy be adaptive. Our multi-interface framework should be able to evaluate the appropriateness of the chosen connectivity strategy to the present conditions. This evaluation process forms the basis for adapting the strategy to better meet current situations.

The INTELiCON architecture preferably provides a general framework to accomplish the features mentioned above. The framework does not rely on any particular implementation, algorithm or standard. It is flexible enough to incorporate current standards and algorithms, as well future ones, to perform a particular task.

The representative work that has been performed and the mechanisms designed for the simultaneous utilization of multiple network interfaces focus mainly on the mechanism to perform that without dealing with cases where the network environment may change rapidly and significantly. Moreover, the existing work does not consider the diversity of applications that exist and the variety of underlying protocols supporting them. They are more focused on specific applications or transport layer protocols (i.e., TCP) restricting their larger-scale utilization. An issue that is not considered from the majority of the studies is how the transmission is stripped across multiple interfaces in the most efficient way. By efficient, we mean, how we can strip the flow across multiple interfaces so we can get the best service delivery subject to the current state of the links.

INTELiCON framework preferably operates transparently to the applications willing to transmit over the network and independently of the protocols being utilized on the various layers of the OSI model. It is highly versatile and it provides all the functional modules to support the existing work in the most efficient way. This is achieved by collecting (e.g., via a measurements module and a control module) from the network all the appropriate metrics related to the status of the network and the quality of the transmission. The information collected is utilized for deciding (e.g., via a decision module) on the transmission method to be applied (e.g., via a packet processing module) and how this method will strip the flow along the active interfaces. Furthermore, for synchronizing the remote (at the other end of the transmission) the INTELiCON modules on the transmission strategy to be followed and aligning like that the end-to-end transmission, there is preferably synchronization signaling exchanged on a dedicated control channel provided by the control module.

The designed framework provides all the appropriate functional modules for both accommodating various and diverse transmission strategies and also adapting the available strategies on the varying conditions of the underlying network. Such an approach will be able to accommodate a large variety of application in a transparent way, achieving the best possible end-to-end performance independently of the underlying network's conditions.

1. Packet Processing Module

The simultaneous use of active interfaces can result in significant improvements in service quality and reliability; however, enabling such use requires additional processing of application packets. The packet processing module is the heart of the INTELiCON framework. It realizes the various transmission strategies to simultaneously and intelligently use the multiple available interfaces. These strategies may rely on but are not limited to IP layer packet mangling, transport protocols that support multihoming (e.g. one or both endpoints of a connection can consist of more than one IP address) like Stream Control Transmission Protocol (SCTP), or IPv6 multi-homing support.

In some illustrative embodiments (such as, e.g., as employed in our lab prototype), the Packet Processing module is realized by applying IP mangling techniques. Among other things, such techniques can be desirable due to the transparency and flexibility that they offer. IP mangling techniques are based on capturing and altering network packets at the IP layer. The capturing of packets is realized by using provided kernel hooks in the network stack. These hooks are implemented by iptables and have the ability to make available a transmitted or received packet from the kernel space to the user space. The altering of packets is performed in the user space before re-injecting them again to the network stack. The Packet Processing module performs the alteration (mangling) of packets based on the connectivity strategy realized. Mainly it is based on modifying the source and destination IP addresses and injecting or removing piggy-backed data.

The modularity of the architecture can support existing mechanisms as part of the packet processing module. Furthermore, one of the novelties of the approach is that the packet processing module can dynamically and transparently adapt the transmission strategies subject to underlying network environment and service quality offered. Preferably, this adaptation is decided by the decision module and is communicated through the control module.

In the preferred embodiments, this work focuses on the improvement of network services, without targeting specific ones. A notable INTELiCON objective is to be effective for any existing and future data exchange service. Hence, the offered transparency is desired for the durability of the proposed framework. Preferably, the services do not have to be altered or to be aware of the existence and functionality of the framework, which mainly, operates at the lower OSI layers. Ultimately, the offered service will be improved since the network will appear healthier to the application layer due to the transparent application of INTELiCON.

To maintain transparency when diverse links are involved in the transmission strategy, the packet processing module should account for potential differences in link speed. Under these circumstances, packets may arrive out of order, or be dropped due to application buffering requirements and timeouts. To realize the benefits of simultaneous utilization and to avoid such unwanted scenarios, the packet processing sub-module preferably supports a buffering and packet reordering function. This function buffers the received packets before releasing them to the application. Buffering received packets allows time for packets to be received from slower interfaces, reordered and delivered to the application. This results in fewer dropped packets and improves the quality of service offered. Preferably, the buffering parameters and the added delays are configurable in the INTELiCON framework and they depend on the requirements of the service. Preferably, these parameters can be bootstrapped and dynamically adapted throughout the transmission by the decision module, which is responsible for the dynamic adaptation of the INTELiCON parameters with respect to the network health and the current quality of the provided service.

Preferably, the packet processing module also contributes to the exchange of performance information. This information is useful for assessing, e.g., service quality, evaluating network health, and adjusting the transmission strategy. In some embodiments, the packet processing module exchanges performance information by piggy-backing status information with transmitted packets. This helps to reduce overhead by taking advantage of existing application traffic packets. When there is no application traffic, performance information can be exchanged via the control module, which is presented in the following section.

2. Control Module

In the preferred embodiments, the INTELiCON Control Module is responsible for providing and managing a dedicated control channel to exchange information related to the effectiveness of the transmission strategy. This information is needed for peer synchronization, service quality and network health. One of the novelties of the architecture is that it provides the means for INTELiCON peers to communicate performance information both in-band and out-band.

In-band information is preferably communicated by piggy backing on the transmitted payload at the transmitting peer, and recovering these data at the receiving peer before delivering the packet to the application. On the other hand, out-band information preferably happens on a dedicated control channel that is set up between the two INTELiCON peers. Even though the piggy-backing of information is more resource efficient, the out-band exchange of information is more robust and versatile, since information can be communicated between the peers without the existence of application traffic between them and there is no need to separate control information from payload upon the reception of a packet. The existence of a dedicated control channel gives the peers flexibility to communicate in real-time the provided service quality, various network health metrics and synchronization information.

The in-band exchange is related mainly to the opportunistic communication of performance metrics between the remote ends. Moreover, the out-band communication between the remote peers, supported by the control module, is responsible for transferring a larger variety of information, which involves both performance metrics and synchronization signaling. Specifically, the performance information is related to service specific quality metrics, including observed average packet delay, jitter, drop and out of order packets. Furthermore, peers can be informed of the link conditions at the other end of the transmission. This information can be useful for the strategy selection mechanisms residing on the decision module.

The in-band or out-band information received by the control module is communicated towards the appropriate modules of the INTELiCON architecture for further processing. At the sender side, measurements, synchronization data, and performance metrics are passed to the measurement and decision modules. At the receiver side, control data are delivered to the packet processing and measurement modules.

3. Measurements Module

The measurements module collects (e.g., locally) and distributes information related to the performance and health of the network and assesses the corresponding service quality. With respect to metrics collection, there are two sources, which provide the required information to the measurements module:

Remote Sources: Control and Packet Processing; and
Local Sources: Monitoring and Probing The control and packet processing modules, as mentioned above, have the ability to collect information from the remote peers. Specifically, the remote peer can utilize the control channel for feedback information related to the provided service or it can piggy back feedback information to the transmitted data packets. The retrieved and collected information is passed to the measurement module as it is shown in FIG. 1. The ability of the architecture to collect feedback information, related to the quality of service delivered, directly from the remote peer is important for the effectiveness and adaptation characteristics of the mechanism.

Apart from the feedback information, the measurements module preferably has the ability to monitor and probe network performance metrics related to link quality and available bandwidth. This information is stored along with the performance metrics collected from the remote peer and is passed to the decision module per its request when a new strategy has to be decided. Furthermore, this information can be forced to the decision module. Specifically, the measurements module preferably has a service quality assessment sub-module. This sub-module utilizes the performance metrics collected by the measurements module for evaluating the quality of the service provided and if this quality check fails then it triggers the decision module to select another appropriate strategy. The triggering process preferably involves both the enabling of strategy selection algorithms and the passing of the related collected metrics (e.g., from the Measurements module to the Decision module). Moreover, the locally collected information can be provided to the Control and Packet Processing modules, so that it can be distributed to the remote peers.

4. Decision Module

The Decision Module is preferably responsible for deciding on the strategy that the Packet Processing Module will realize. The core of this module is an optimization algorithm that receives as input various parameters that represent the network environment, the current level of QoS offered and the targeted level of QoS requested by the user or expected by the service. The Decision Module decides among different strategies and configures the parameters of the selected strategy so that the desired QoS is achieved (e.g., subject to the current network state).

Apart from deciding on the strategy to be applied, the Decision Module also continuously assesses the delivered quality under the existing network conditions. Service quality is quantified by collecting various performance metrics and utilizing quality assessment functions. The Decision Module can preferably compare the desired service quality with the service quality delivered by the applied transmission strategy, and can dynamically reconfigure the current strategy or implement a new transmission strategy if necessary The dynamic adjustment of strategies in real time is very powerful and represents a promising approach for delivering excellent service quality by adapting to the underlying network environment. Not only should the network environment and desired service quality be taken into consideration, but also the cost of switching transmission strategies should be accounted for as well. This cost affects the level of achieved QoS and is desirable to be taken into consideration during the adaptation process. Since the core mechanism of the Decision module is based on optimization algorithms, a notable element of the decision process is the quantification of service quality. This is preferably realized with the application of utility functions involving metrics that represent the network environment, the targeted and current quality of service and the cost of switching between the existing and the new strategy.

This can be written as, for example:

$$f(N, \Delta Q, Cs_{i \rightarrow S_{i+1}})$$

where,
N=Network environment;
ΔQ=Difference between QoS achieved and desired QoS;
$s_i$=Current strategy;
$s_{i+1}$=Future strategy;
C=Cost of switching between current and future strategy.

With a given utility function to be optimized, the choice of optimization algorithm is noteworthy. This mechanism is at the core of the Decision module. In an illustrative design, we utilized the Simulated Annealing (SA) algorithm (see, e.g., Reference 14, incorporated by reference above entitled "Optimization by Simulated Annealing") which is a general randomization approximation algorithm that at the limit becomes an optimization algorithm. SA is very powerful due to its wide applicability and versatility. Even though we have employed SA in some embodiments, various embodiments can employ other algorithms or a combined application of a set of algorithms and are not limited to the illustrative examples, depending on the scenarios under consideration.

5. INTELiCON Controller

In the preferred embodiments, the INTELiCON controller is the module responsible for preserving the modularity of the designed framework. It provides a common communication interface between the rest of the INTELiCON modules by relaying information between them. Preferably, the INTELiCON controller implements an interprocess communication module that intercepts and relays information that flows between the various modules. In that fashion the modules (1-4) can communicate between each other without having directly to contact each other by using a common message passing framework. One importance of INTELiCON controller module lies, e.g., on the importance of modularity and the expandability of the framework. For example, in the case when the framework will have to be expanded with more functionality that involve the cooperation of more than one of the modules, then the provided, by the INTELiCON controller, interprocess communication framework will support this expansion as transparently as possible to the participating modules.

Furthermore, the INTELiCON controller results into more efficient communication between the modules. Specifically, assuming that the INTELiCON module did not exist, then in order for the modules (1-4) to communicate between them, they would have to open and keep track of every possible pairwise interprocess communication channel to the rest of the modules. This approach would have wasted crucial processing and power resources. Instead, the application of an INTELiCON controller module results into the creation and utilization of one interprocess communication channel per module. This single channel is enough for the communication of each module with the rest of the modules through the INTELiCON controller module.

Various Novelities:

Some fundamental novelties of our solution is that our design provides a unified framework that intelligently, transparently and in a modular way enables the simultaneous utilization of multiple interfaces. On the other hand, the other related solutions discussed above attempted one or more parts of the problem without providing a framework to solve the problem completely. The INTELiCON framework, as compared with respect to other approaches in the area of multiple interfaces utilization for better performance, presents many advantages/difference, which include, e.g.:

a) Existing approaches focus on specific transmission strategies that are acting on various layers of the OSI model, attempting to exploit the benefits of multiple transmission interfaces utilization. Whereas, the INTELiCON model provides a framework in which all these different strategies can be implemented and effectively combined for improving transmission's (service's) performance.

b) Existing approaches focus on a limited group of applications since they assume specific transport protocols (e.g., TCP, SCTP). Whereas, the INTELiCON model does not suffer from this limitation since it does not rely on any transport layer assumption, so it is not limited only to applications that use an assumed transport layer.

c) The majority of transmission strategies are limited to a specific mechanism. When conditions on the network change or when links are added or removed, then they do not have the ability to adapt appropriately. Whereas, the INTELiCON framework can support a wide range of transmission strategies. By applying the appropriate utility function, the decision mechanism can select another transmission strategy that fits better the current network and transmission state. This versatility offered by the INTELiCON framework in combination with the intelligence added by the decision module renders the framework as novel and revolutionary among the existing mechanisms proposed for the utilization of multiple interfaces.

d) The INTELiCON framework supports the collection of diverse metrics related to network state and current transmission quality. The collection happens either by probing the network (e.g., Measurements Module) or by receiving transmission quality and network status metrics from the receiving end (e.g., Control and Packet Processing Modules). There are not any limitations with respect to the metrics being collected, and this list can be modified dynamically depending on the performance requirements and the corresponding application. The latter is innovative compared to the existing mechanisms that either do not perform any real time probing or they have a very limited flexibility with respect to the metrics being collected. The variety and diversity of the metrics being collected can further boost the ability of the INTELiCON framework to accurately adapt the transmission strategy to the current network state and the expected end-to-end transmission quality.

e) Furthermore, with respect to the collection of metrics, existing strategies focus on TCP or SCTP transport protocols due to the inherent ability to provide qualitative transmission feedback. However, a problem with these mechanisms is that the feedback is limited and very specific to the control signaling of the selected transmission protocol. Whereas, the INTELiCON framework, as mentioned also in d) above, is not limited since it provides its own versatile and expandable mechanism for the collection of metrics. These metrics can be related to, e.g., the underlying network environment or the end-to-end transmission quality. Moreover, the selection of metrics to be collected is not limited and pre-specified, since it can change dynamically based on the performance requirements or the needs of the current transmission strategy.

f) Application of utility functions and optimization algorithms (e.g., Decision Module) for determining the transmission strategy results in better adaptation as compared to heuristics and policies utilized by existing mechanisms.

The existing works focus on designing just the transmission strategy to be applied for the utilization of multiple interfaces, which in our design is part of the Packet Processing module. Previous studies have not dealt with the larger problem of dynamic and intelligence adaptation among diverse strategies with respect to the current network state and end-to-end transmission quality.

The majority of the existing works focused on specific applications or transport layers (e.g. TCP or SCTP).

We have identified that by supporting the union of the existing work and by providing a framework that involves all the required functional components for the efficient unification of this work, we can accommodate, in the best possible way, all the different network and transmission scenarios.

Furthermore, the dynamic selection of the strategies based on the optimization mechanism and the metrics collected provides the ability to the framework to adapt in an intelligent way on the current state of the network and provide the end-to-end service required. Previous techniques were focused in a more limiting space of applications or transport protocols, rather than expanding to an approach that can be versatile enough to be applied in diverse scenarios.

Illustrative Prototype:

In an illustrative and non-limiting example, we have created a prototype implementation under Linux platform for the INTELiCON architecture. As mentioned above, the INTELiCON architecture provides a general and versatile framework, which can accommodate many possible options for implementing the various modules. This section presents our lab prototype providing also implementation details related to the INTELiCON modules. Prior to that, brief details and assumptions about the utilized service and the underlying network environment are provided.

Due to its popularity and demanding service requirements, we selected a multimedia service to evaluate our INTELiCON prototype. We have installed the VLC media player (see, e.g., Reference [16]), which can be used as a server to stream in unicast or multicast in IPv4 or IPv6.

Figure 2:
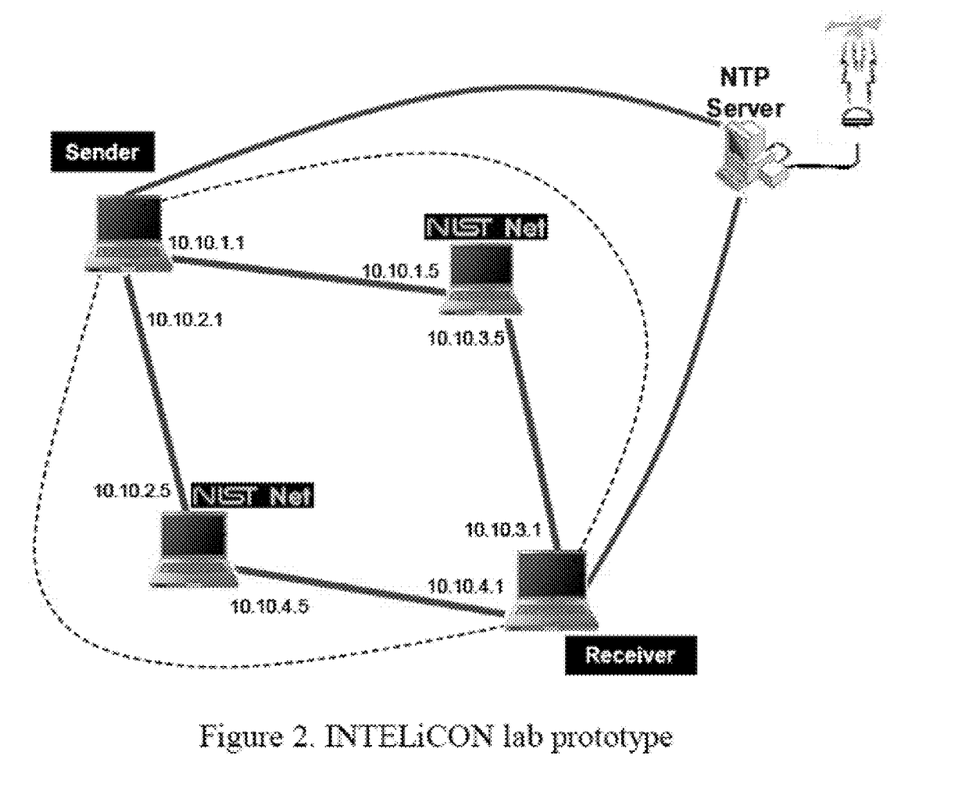
FIG. 2 is an architectural diagram depicting an illustrative lab prototype system constructed.

The network environment we have generated is pictured in FIG. 2. We have used a sender and a receiver machines each having two active Ethernet interfaces. Each pair of remote interfaces is connected via a link. The characteristics of each of the links such as delays and packet losses are emulated by two machines that run NISTnet (see, e.g., Reference [18]), as pictured in FIG. 2.

Furthermore, for the collection of more accurate statistics on packet delay, we have connected the sender and receiver machines to an NTP server, for their clock synchronization.

The Packet Processing module has to stream an application session through multiple interfaces. To accomplish this, we have utilized IP mangling features supported under Linux, using the netfilter/iptables library (see, e.g., Reference [17]). By utilizing the unicast VLC streaming, the UDP packets from the sender are directed to one of the receiver's IP address. Transparently to the application (VLC), these packets are filtered and processed (i.e. the destination IP address is modified for selecting the appropriate interface or the packet is duplicated and transmitted). At the receiving end, packets received from pre-specified IP addresses are filtered and processed (i.e., tuning of the IP address fields and re-ordered) before being delivered to VLC application. Thus, INTELiCON intervenes between the sender and receiving ends in such a way that the applications and the corresponding transport layer are unaware of how packets are transmitted and delivered.

As part of the packet processing unit, we have implemented the in-band communication of performance information via piggy backing—we add pre-specified extra payload to each transmitted packet related to packet delays. This payload is stripped when the packets are received and is passed to the Measurement module, which collects and stores these performance metrics along with the out-band metrics communicated over the control channel maintained by the Control module. The Decision module of the sender can utilize these metrics to decide on the connectivity strategy to be realized.

Furthermore, when we introduce different delays on the two links, packets may arrive out of order. The Packet Processing module at the recipient is responsible for buffering and reordering the packets, as well as detecting and dropping duplicate packets before delivering the processed packets, transparently to the application. The Packet Processing module currently supports two types of connectivity strategies: alternate-transmission and duplicate transmission. Alternate transmission sends packets to the available interfaces on a round-robin basis. Thus, if there are two interfaces, odd numbered packets would go out through the first interface and even numbered ones through the second.

Duplicate-connectivity strategy would create duplicate copies of packets and send them out simultaneously through the available interfaces. These two connectivity strategies have emerged from two general classes of strategies: a) aggregation strategies, used in scenarios where the overall application bandwidth is greater than what any one interface can provide, and b) redundancy strategies, where some form of coding is used to improve error resilience over unreliable links.

Figure 3:
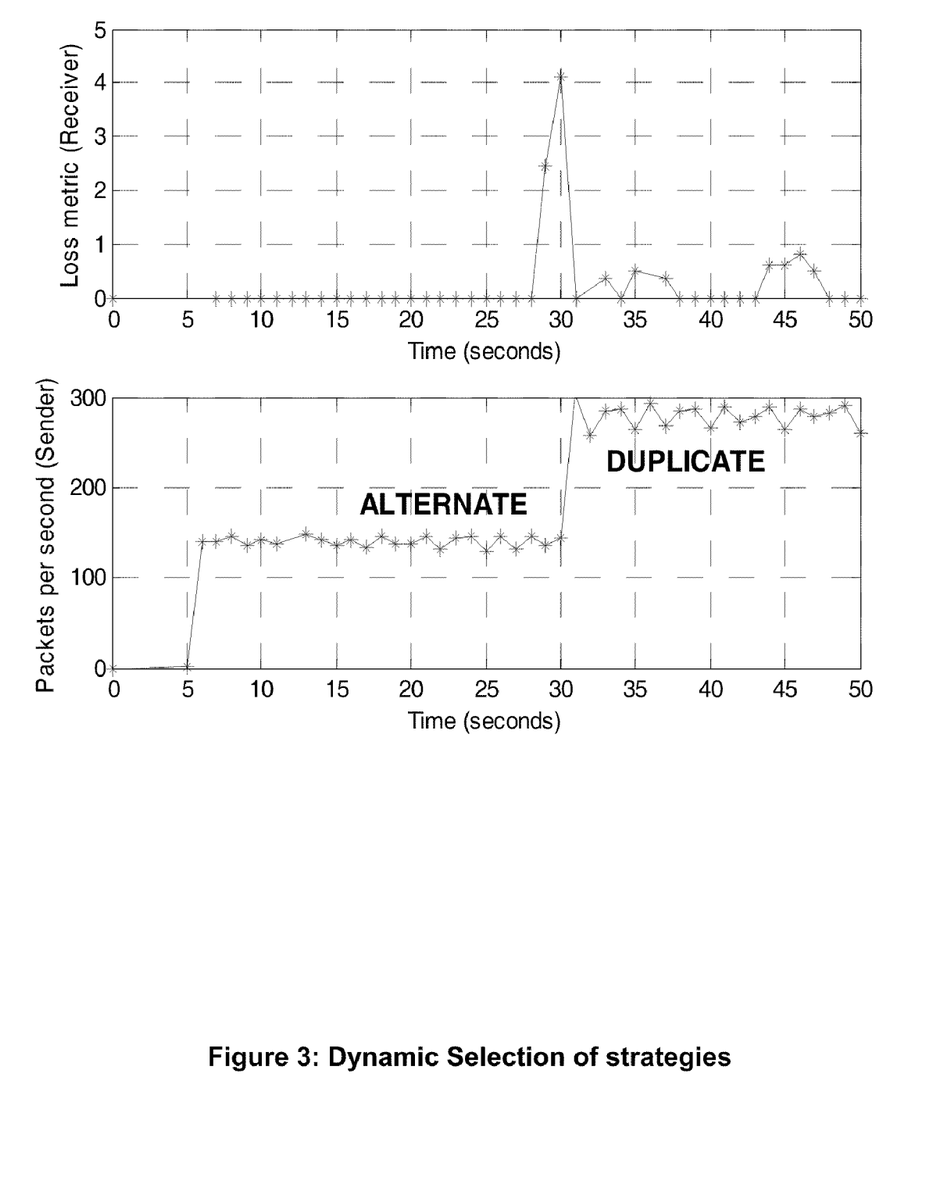
FIG. 3 shows some graphs related to dynamic selection of strategies.

Illustrative Results Achieved:

In this section, we further present a simple experiment that was performed on our lab prototype (shown in FIG. 2). In this experiment, the various INTELiCON modules interact to dynamically adapt the transmission strategy and to provide a high QoS. FIG. 3 illustrates how the INTELiCON architecture dynamically adapted the connectivity strategy as the link reliability varied. For this experiment, we implemented two diverse transmission strategies as part of the Packet Processing Module: a) the alternate strategy and b) the duplicate strategy. The former strips the transmitted packets of a single flow into multiple links in an alternate way (e.g., round robin). The latter transmits the same packet into multiple interfaces. For the experimental prototype, we utilized two links and we emulated diverse link conditions with the application of NISTnet, which is a link emulator.

The graph on the top of FIG. 3 is the loss metric computed at the Receiver, while the bottom graph shows the number of packets sent by the Sender machine. The video streaming rate was ~150 packets/sec. At the beginning, both links are equivalent and lossless. The decision module enforced the splitting strategy by transmitting 50% of packets to each interface in an alternating fashion. This selection is for load balancing the traffic between the two equivalent links. See FIG. 3 entitled Dynamic Selection of strategies.

As seen from the zero loss rate at the beginning, the number of received packets matches the number of transmitted packets, even though they are coming from two different interfaces. At around 27 seconds, we introduce 5% loss on both the links (using the NISTnet module), resulting in an overall 5% application loss rate. The Sender machine becomes aware of the higher loss from the performance feedback and decides to switch to the duplicate transmission strategy, informing also the Receiver machine via the Control Module. The new scheme is effective at around 30 seconds—as observed from the bottom graph where overall number of sent packets is now twice as what the application generates. Given that the same packet is being sent over both links, a packet loss will happen only when both links fail to deliver the packet. Probabilistically, the resulting packet loss rate is 0.25%. This significantly reduced loss rate is verified by the results of FIG. 3, after the activation of the duplicate scheme (>30 secs). The proof of concept implementation and the experiment presented here demonstrates capabilities of the INTELiCON architecture to dynamically and intelligently adapt the transmission strategies for delivering high QoS.

Illustrative Advantages:

The INTELiCON framework, as compared to other approaches in the area of multiple interfaces utilization for better performance, presents many adavantages, including for example:

a) In contrast to existing approaches that focus on specific transmission strategies, the INTELiCON framework does not propose any specific transmission strategy but provides the framework that all these different strategies can be unified.

b) Existing approaches focus on limited group of applications since they assume specific transport protocols (e.g., TCP, SCTP), but the INTELiCON framework does not suffer from this limitation since it does not rely on any transport layer assumption, so it is not limited only to applications that use the assumed transport layer.

c) The INTELiCON framework adapts the transmission strategies and their parameters to the current network and transmission states by applying the appropriate utility functions—representing the performance requirements—via the decision module.

d) The INTELiCON framework, using the Control, Measurements and Packet Processing modules, supports a collection of diverse metrics related to network state and current transmission quality, as opposed to the existing mechanisms that support limited set of probes.

f) Application of utility functions and optimization algorithms (e.g., Decision Module) for determining the transmission strategy results in better adaptation compared to heuristics and policies utilized by existing mechanisms g) In the lab experiment described in Reference [11], if only one strategy was utilized, then the transmission would have resulted into low quality end-to-end transmission, but the adaptation of the strategy resulted into quick recovery from the faulty link and into seamless and continuous high end-to-end quality.

Illustrative Environments and Applications:

In some illustrative examples, one or more aspects described herein can be employed within the following illustrative products and/or services. Middleware based on this invention can be built and installed on multi-mode devices include, e.g., smartphones, PDAs and laptops. This middleware can also be installed at web services that provide bandwidth intensive services over the Internet to multi-mode devices. As one example, a video sharing site such as, e.g., YouTube, GoogleVideo, MSN or any other streaming video site could install this software to better manage the service experience for their multi-mode customers. This invention can also have a significant commercial impact in the Home Video market. For example, an embodiment of this invention could be built into a home media server that streams video content to a wireless media receiver connected to a TV that displays the content. The invention can improve the wireless video quality and reliability delivered between the media server and the receiver. The invention may also be valuable to video security applications where it can be used to offer redundant delivery of critical information. This would improve reliability by providing a failover mechanism.

In some illustrative cases, aspects of the present invention can be of interest to wireless communication devices manufacturers (such as, e.g., by way of example, Intel, Motorola, Atheros, Samsung, etc.), as well as to wireless equipment manufacturers (such as, e.g., by way of example, Cisco, Buffalo, EMC, NetGear, D-Link, etc.), and also to web services that deliver high bandwidth or data critical services (such as, e.g., by way of example, YouTube, GoogleVideo, MSN Video, etc.).

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. An intelligent connectivity framework for the simultaneous use of multiple interfaces of a wireless device, comprising:
   a wireless device having a plurality of heterogeneous wireless network interfaces;
   said wireless device being configured to discover metrics related to the status of networks and the quality of a transmission;
   said wireless device being configured to decide on an intelligent connectivity strategy involving use of a plurality of said multiple network interfaces based on said discovered metrics; and
   said wireless device being configured to stream an application session over a plurality of said multiple interfaces simultaneously without application-layer modifications.

2. The intelligent connectivity framework of claim 1, further including a similar intelligent connectivity framework on a plurality of mobile peer devices.

3. The intelligent connectivity framework of claim 1, wherein said wireless device further includes a measurements module for collecting information related to said metrics.

4. The intelligent connectivity framework of claim 3, wherein said measurements module is configured to collect metrics from remote sources, including remote peer mobile devices.

5. The intelligent connectivity framework of claim 4, wherein said mobile device is configured to receive metrics information from remote sources via a control channel.

6. The intelligent connectivity framework of claim 5, wherein said wireless device further includes a control module for managing the control channel to exchange information related to the transmission strategy.

7. The intelligent connectivity framework of claim 3, wherein said measurements module is configured to collect metrics from local sources.

8. The intelligent connectivity framework of claim 7, wherein said measurements module is configured to monitor and/or probe network performance metrics related to link quality and/or available bandwidth.

9. The intelligent connectivity framework of claim 3, wherein said wireless device further includes a decision module for deciding on a strategy for employing multiple interfaces based on information related to said metrics within the measurements module.

10. The intelligent connectivity framework of claim 9, wherein said decision module continually assesses quality and/or network conditions based on said information and dynamically adapts said strategy in real time.

11. The intelligent connectivity framework of claim 9, wherein said decision module is configured to decide on a strategy for employing multiple interfaces based on network environment information, service quality information, and costs of transmission strategies.

12. The intelligent connectivity framework of claim 11, wherein said decision module renders a decision based on optimization algorithms.

13. The intelligent connectivity framework of claim 9, wherein said wireless device further includes a packet processing module that implements the strategy decided by the decision module.

14. The intelligent connectivity framework of claim 13, wherein said packet processing module is configured to account for differences in link speeds.

15. The intelligent connectivity framework of claim 14, wherein said packet processing module is configured to buffer received packets.

16. The intelligent connectivity framework of claim 14, wherein said packet processing module is configured to exchange performance information by piggy-backing status information with transmitted packets.

17. The intelligent connectivity framework of claim 1, wherein said wireless device is configured to communicate performance information related to said metrics both in-band and out-band.

18. The intelligent connectivity framework of claim 17, wherein in-band information is communicated by piggy-backing on a transmitted payload packet by the wireless device as a transmitting peer, and recovering such information at a receiving peer before delivering the packet to the application.

19. The intelligent connectivity framework of claim 17, wherein out-band information is communicated via a dedicated control channel between the wireless device and another peer.

20. The intelligent connectivity framework of claim 19, wherein during communication between the wireless device and another peer, at the sender side, measurements, synchronization data and performance metrics are passed to the measurement and decision modules, and at the receiver side, control data are delivered to the packet processing and measurement modules.

21. A method for the intelligent management of and simultaneous use of multiple interfaces of a wireless device, comprising:
   providing a wireless device having a plurality of heterogeneous wireless network interfaces;
   the wireless device discovering metrics related to the status of networks and the quality of a transmission;
   the wireless device deciding on an intelligent connectivity strategy involving use of a plurality of said multiple network interfaces based on said discovered metrics; and
   the wireless device conducting an application session over a plurality of said multiple interfaces simultaneously without application-layer modifications.

* * * * *

UNITED STATES PATENT AND TRADEMARK OFFICE
CERTIFICATE OF CORRECTION

| | |
|---|---|
| PATENT NO. | : 8,014,819 B2 |
| APPLICATION NO. | : 12/114940 |
| DATED | : September 6, 2011 |
| INVENTOR(S) | : Manousakis et al. |

It is certified that error appears in the above-identified patent and that said Letters Patent is hereby corrected as shown below:

On the Title Page, in Item (73), under "Assignees", in Column 1, Line 1, delete "Toshiba America Research, Inc," and insert -- Toshiba America Research, Inc., --, therefor.

On the Title Page, in Item (56), under "OTHER PUBLICATIONS", in Column 2, Line 6, delete "A. Abd El Al," and insert -- A. Abd et al., --, therefor.

On the Title Page, in Item (56), under "OTHER PUBLICATIONS", in Column 2, Line 11, delete "Paris" and insert -- Pairs --, therefor.

On the Title Page, in Item (56), under "OTHER PUBLICATIONS", in Column 2, Line 17, delete "Hewiett-Packard" and insert -- Hewlett-Packard --, therefor.

In The Drawings

In Fig. 4, Sheet 4 of 4, delete "FIG. 4" and insert -- Figure 4 --, therefor.

In The Specification

In Column 3, Line 19, delete "Netwoking" and insert -- Networking --, therefor.

In Column 3, Line 24, delete "A. El Al," and insert -- A. Abd et al., --, therefor.

In Column 3, Line 43, delete "communities," and insert -- communities", --, therefor.

In Column 3, Line 54, delete "Li Li," and insert -- Li Erran Li, --, therefor.

In Column 4, Line 25, delete "Traport" and insert -- Transport --, therefor.

Signed and Sealed this
Twelfth Day of May, 2015

Michelle K. Lee
*Director of the United States Patent and Trademark Office*

CERTIFICATE OF CORRECTION (continued)
U.S. Pat. No. 8,014,819 B2

In Column 4, Line 33, delete "they" and insert -- there --, therefor.

In Column 9, Line 31, delete "prefer" and insert -- preferred --, therefor.

In Column 12, Line 9, delete "the provided" and insert -- they provided --, therefor.

In Column 13, Line 24, delete "necessary" and insert -- necessary. --, therefor.

In Column 14, Line 29, delete "Novelities:" and insert -- Novelties: --, therefor.

In Column 17, Line 46, delete "adavantages," and insert -- advantages, --, therefor.